S. KELLY.
Bee Hive.
No. 18,815.
Patented Dec. 8, 1857.
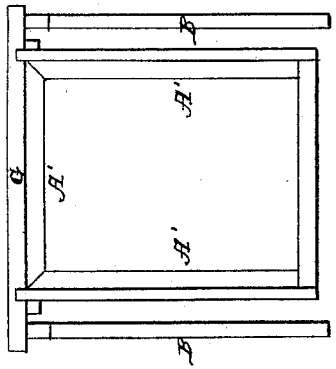
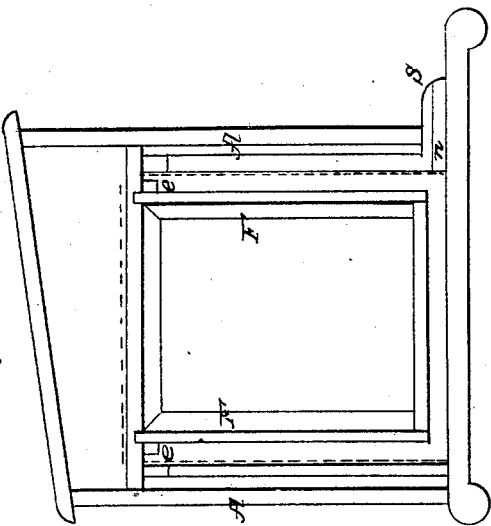
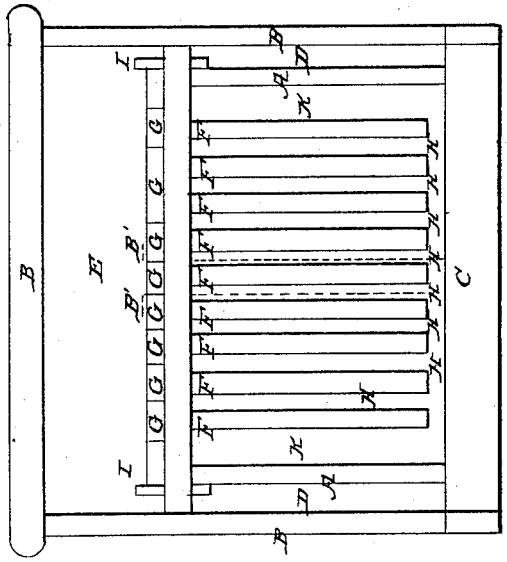
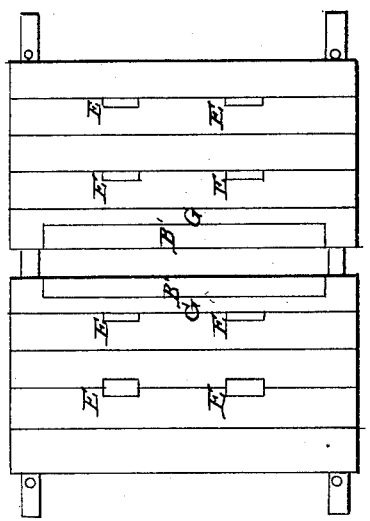

UNITED STATES PATENT OFFICE.

SAML. KELLY, OF WASHINGTON, DISTRICT OF COLUMBIA.

BEEHIVE.

Specification of Letters Patent No. 18,815, dated December 8, 1857.

*To all whom it may concern:*

Be it known that I, SAMUEL KELLY, of the city of Washington, in the District of Columbia, have invented a new and useful Improvement in Beehives; and I do hereby declare that the following is a full and exact description thereof, reference being had to the accompanying drawings and to the letters of reference marked thereon.

Figure 1, is a vertical section with the sides of the box removed. Fig. 2, is a plan view of the inner hive. Fig. 3, is an end view of the inner hive with the end board removed. Fig. 4, is a vertical section through the hive showing the comb I wish to remove. Fig. 5, is a front view of the passageways and the sliding valve.

To enable others skilled in the art to make and use my invention, I will proceed to describe its construction and operation.

In Fig. 1 the inner box or hive proper is represented by letters (A, A,) inclosed in outer box (B, B,) both of which are open at bottom and rest on platform (C,) with the space E between the tops so that jars or vessels of any kind may be placed on the box (A) to receive the surplus virgin honey. The advantage of such an arrangement is the even temperature gained for the protection of the bees from the bee moth surrounding the inner hive on all sides. If the moth deposits its eggs under the edges of it then by moving the box once in every four or five days and cleaning the edges you will have no further annoyance from that great destroyer of bees. In hiving a swarm of bees the inner box can be taken from the footboard and the swarm hived in it, the hive is then replaced without having to remove the swarm hived in it. I construct the sash or four-sided frames F in Fig. 1, 1¼ inches thick attached to guide bars G 1½ inch wide, which bars form the lid or cover of the inner box or hive, and are used as honey boards, the bars being ⅜ wider than the frames; the spaces, H, are ⅜ of an inch. Between the frames as they hang in the hive there is a space, K, ½ an inch between the outer frame and the sides of the hive, so that when pins, I, are taken out the frames can be moved one-fourth of an inch toward the sides without inconveniencing the bees. The bars or frames F are always kept a certain distance apart yet it may sometimes occur that the bees may allow the comb to project out farther than usual, then in order to insert the zinc plates B' between the frames without injuring the comb or the bees at work, I can remove the pins (I) and gently slide the frames over, thus widening the space between the frame or frames I wish to remove which will allow the plates, B', to be inserted without any injury to the comb or bees, and then when all the bees have passed out (the valve, O, being placed over the passageway opposite the frame selected), they can pass out lifting the valve up in doing so, but they cannot return. By this arrangement no portion of the bees are disturbed, but those only at work in the frame I select and remove, an arrangement heretofore not effected.

The sheets of zinc B in Fig. 1, may be indented on both sides of any frame extending down to the bottom of the hive and reaching entirely across the hive, causing the bees to leave it and pass out through the passageway over which is placed the valve, O, in Fig. 5, until all the bees have left the frame or frames desired to be removed, this can be done without ingress of a single bee to said frame, as shown in Fig. 2, which figure shows the top of the hive or honey board as formed by the guide bars with one bar removed and the sheets of zinc B inserted, the edges of which are turned and rest on the bars, G.

Fig. 3, represents an end view of the inner box or hive. A' is a sash frame with the inner edge chamfered and attached to guide bar G, resting on the top of box B, extending over the sides of the same, enabling them to be removed easily, which keep the frames F from the sides of the hive. By this arrangement the operator has complete control over all the comb of the hive and he can remove any part of the same without the escape of a bee or disturbing the swarm in the rest of the hive. I cut the holes E, Fig. 2, of such a width that worker bees only can have access to the virgin honey. When it is necessary to enlarge the holes it can be done by reversing the bars and placing the holes together, as shown in Fig. 2. The advantage of such an arrangement is that while the working bees are making honey the drones have no access to it to eat it, nor the queen to lay her eggs therein.

The movable passageways extending from the inner to the outer hive may be made of as many holes as there are frames in the inner hive, holes being cut through the hive directly opposite each passageway; the outer box fits over the same. It will be seen that when one of the frames is shut off by the zinc plates as shown in dotted lines in Fig. 4, it will be a separate compartment with its own distinct passageway (*n, n*) leading to the outside of the hive. The wire S to which is attached sliding valve O, (which lifts up for the bees to pass out and then falls down to prevent their return,) which valve can be slid on wire, S, opposite any passageway I wish, leading to any frame I wish to take from the hive. It will be seen that by this arrangement the bees can readily pass out from the frame selected, but they cannot return to it.

In Fig. 5, *n*, are the movable passageways to allow the bees to pass into and out of the hive; O the sliding valve which can be moved opposite any hole or passageway leading to the bar I wish to take from the hive.

S is the wire over which the valve C is attached.

Having thus fully described the operation and construction of my invention, what I claim as new and desire to secure by Letters Patent is.

The sliding frames F, removable pins I and dividing zinc plates B' in combination with the movable passageways and the sliding valve O, arranged in the manner and for the purposes set forth.

SAML. KELLY.

Witnesses:
EDWIN F. BROWN,
T. G. CLAYTON.